United States Patent [19]

Nashimoto et al.

[11] Patent Number: 4,509,893
[45] Date of Patent: Apr. 9, 1985

[54] DEVICE FOR STORING AND RETRIEVING ARTICLES IN A SHELF STACK

[75] Inventors: Junichi Nashimoto, Yokosuka; Zenkichi Kurokawa, Yokohama, both of Japan

[73] Assignee: Okamura Corporation, Japan

[21] Appl. No.: 457,958

[22] Filed: Jan. 14, 1983

[51] Int. Cl.³ ............................................. B65G 1/00
[52] U.S. Cl. ................................................... 414/280
[58] Field of Search ........................ 414/280, 661, 277

[56] References Cited

U.S. PATENT DOCUMENTS

| 3,850,316 | 11/1974 | Schmitt | 414/280 |
| 3,951,277 | 4/1976 | Hegelman | 414/280 |
| 4,032,027 | 6/1978 | Lindberg | 414/280 X |
| 4,331,418 | 5/1982 | Klebe | 414/277 |

Primary Examiner—Joseph E. Valenza
Assistant Examiner—David A. Bucci
Attorney, Agent, or Firm—Hayes, Davis & Soloway

[57] ABSTRACT

An article handling and pushing device is located on one side of a set of stacked shelves, is movable vertically, and includes a transfer shelf which can be brought to oppose any selected one of the stacked shelves by such vertical motion and also a push arm for moving articles from the transfer shelf away from the handling and pushing device onto the currently selected opposed one of the stacked shelves. An article pushing out device is located on the other side of the shelves, is also movable vertically, also can be brought to oppose any selected one of the stacked shelves by such vertical motion, and includes an air cylinder for pushing articles off from the currently selected one of the stacked shelves away from itself. A raising device moves both the article handling and pushing device and the pushing out device vertically, and keeps both of them at substantially the same height at all times. Optionally, the raising device may include an elevator device which is movable in a certain direction, a first and a second cable, and first and second pulley systems over which the first and the second cable respectively pass, the one ends of the first and second cables being attached to the elevator device so as to be pulled by it during its motion, and the other ends of the first and second cables being respectively attached to the handling device and the pushing out device so as to support them vertically.

2 Claims, 1 Drawing Figure

U.S. Patent     Apr. 9, 1985     4,509,893
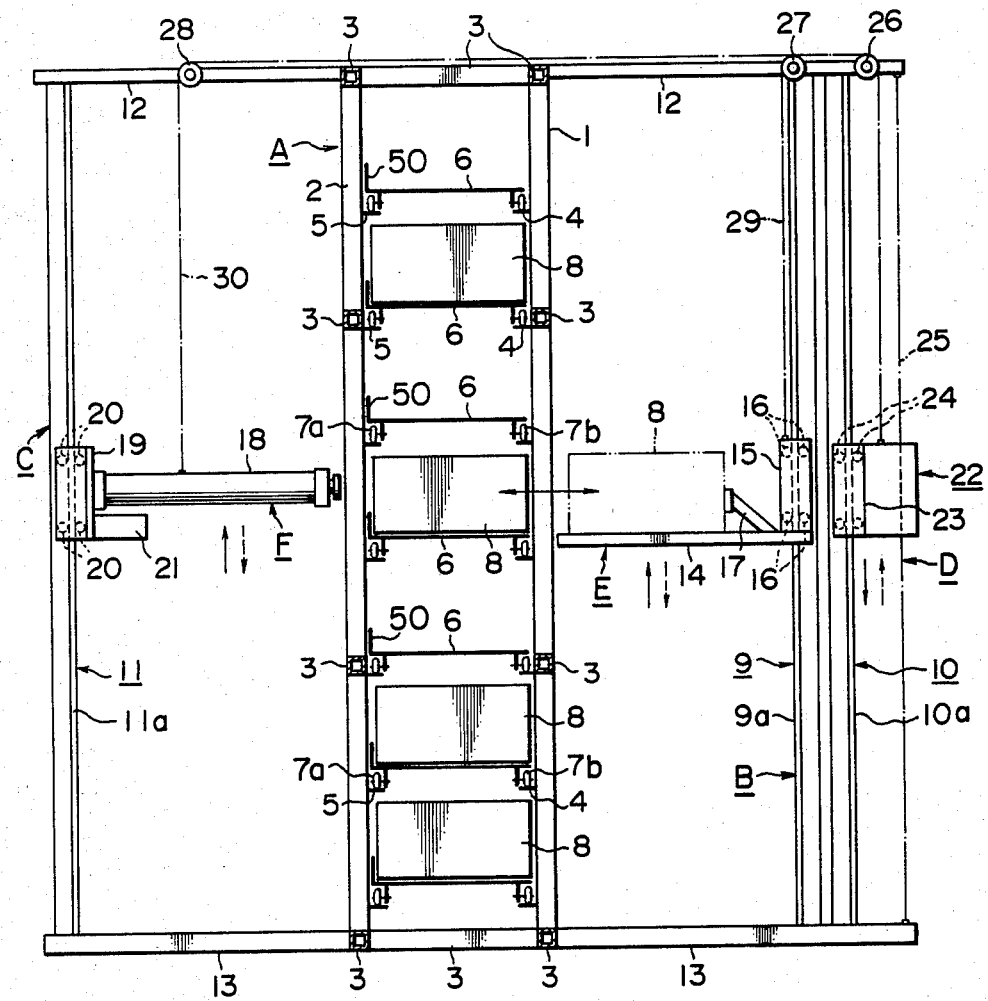

4,509,893

DEVICE FOR STORING AND RETRIEVING ARTICLES IN A SHELF STACK

BACKGROUND OF THE INVENTION

The present invention relates to a device for storing and retrieving articles in a shelf stack.

There is a known type of rotary multi-shelf article storage warehouse, in which a plurality of horizontally running track systems are provided spaced apart in the vertical direction, each comprising an outer rail and an inner rail on the same level, each of the outer rails being shaped as an oval, and each of the inner rails being located within its outer rail with corresponding points on the outer and inner rails being equidistant. The spacing between each contiguous pair of the track systems in the vertical direction is substantially equal. On each of the track systems there run a plurality of wheeled shelves, contiguous ones of which are linked one to the next by link means so as to form a train, each of said trains being driven along its track system by a train drive means. These wheeled shelves are adapted to carry articles, which may be containers adapted for carrying small objects or the like.

Such a rotary multi shelf type article storage warehouse is convenient for storing a multiplicity of small objects in an organized manner, but the problem has arisen that if the available space for such a warehouse is exploited as effectively as possible then the upper ones of the stacked shelves become rather inaccessible, and it is difficult to place articles on these upper shelves, and to retrieve said articles, easily.

SUMMARY OF THE INVENTION

Accordingly, it is the primary object of the present invention to provide an article storing and retrieving device, which can conveniently be operated in conjunction with such a rotary multi-shelf article storage warehouse, so as to conveniently access the upper shelves thereof.

It is a further object of the present invention to provide an article storing and retrieving device of the type above, which eliminates any requirement for difficult lifting of the articles to or from an inconvenient height by the operator of the system, and which is reliable in operation.

According to the present invention, these and other objects are accomplished by an article storing and retrieving device, for use with a stacked set of a plurality of shelves, comprising: (a) an article handling and pushing device, located on one side of said set of stacked shelves, movable in the vertical direction, and comprising a transfer shelf which can be brought to oppose any selected one of said stacked set of shelves by said vertical motion, and a means for moving articles from said transfer shelf away from said article handling and pushing device onto said opposed one of said stacked shelves; (b) an article pushing out device located on the other side of said set of stacked shelves, movable in the vertical direction, which can be brought to oppose any selected one of said stacked set of shelves by said vertical motion, and comprising a means for pushing articles off from said selected one of said stacked shelves away from itself; and (c) a raising device, which moves both said article handling and pushing device and said article pushing out device in the vertical direction, and which keeps both said article handling and pushing device and said article pushing out device at substantially the same height at all times.

According to such a structure, when it is desired to store an article on a particular one of the shelves, first the article handling and pushing device is positioned by the raising device to a convenient height and the article is placed on its transfer shelf. Next, the transfer shelf is brought to oppose said particular one of the shelves, by the raising device moving the article handling and pushing device in the vertical direction. Finally the means for moving articles is actuated so as to move said article from said transfer shelf away from said article handling and pushing device onto said opposed one of said stacked shelves. On the other hand, when it is desired to retrieve an article from a particular one of the shelves, first the article handling and pushing device is positioned by the raising device so as to oppose said particular one of the shelves, by being moved in the vertical direction, and simultaneously the article pushing out device will automatically be positioned by said raising device so as to oppose said particular one of the shelves. Next, the pushing out device is actuated so as to move said article from said one of said stacked shelves onto the opposed transfer shelf of the article handling and pushing device. Finally, the article handling and pushing device is positioned by the raising device to a convenient height and the article is removed from its transfer shelf. Thus, the article may be conveniently stored on and retrieved from any chosen one of the stacked shelves, without any requirement for difficult lifting of the article to or from an inconvenient height by the operator of the system.

BRIEF DESCRIPTION OF THE DRAWING

The present invention will now be shown and described with reference to a preferred embodiment thereof, and with reference to the illustrative drawing. In the sole FIGURE of the drawing, there is shown a schematic cross sectional view of an article storage warehouse which includes an article storing and retrieving device according to the present invention.

DESCRIPTION OF THE PREFERRED EMBODIMENT

The present invention will now be described with reference to a preferred embodiment thereof, and with reference to the appended drawing.

In the central part of the drawing, there is shown a relevant part of an article storage warehouse A, which is not itself a part of the present invention, in schematic cross sectional view. The left hand side of the construction in the FIGURE in fact is the inside of the article storage warehouse A, and the right hand side of the construction is the outside of the article storage warehouse A. The frame of this article storage warehouse A comprises a plurality of front vertical columns 1 and a plurality of rear vertical columns 2, only one of each of which types can be seen in the drawing; and a plurality of horizontal rods 3, which are shown end on in the drawing, link these vertical columns 1 and 2. A plurality of track systems are provided spaced apart in the vertical direction for wheeled shelf trains to run upon as will be explained shortly, and each of these track systems comprises an outer rail 4 and an inner rail 5 which are on the same level. In fact, each of the outer rails 4 is shaped as an oval, and each of the inner rails 5 is located within its outer rail 4 with corresponding points on the outer rail 4 and on the inner rail 5 being equidistant. The plane of each of the track systems in fact is perpendicular to the paper of the drawing and intersects said drawing paper in a horizontal line from the point of view of the drawing, and the section of the drawing lies along the central axes of the oval outer and inner rails 4 and 5. The spacing between each contiguous pair of the track systems in the vertical direction is substantially equal.

On each of the track systems there runs a train which is composed of a plurality of wheeled shelves 6; although in the FIGURE in fact only one wheeled shelf 6 of each of these shelf trains can be seen. Each of the shelves 6, in more detail, comprises a flat base which is mounted on outer wheels 7a and inner wheels 7b which are rotatably mounted to its under surface by brackets and axles, and also comprises a rear stop plate 50 which extends upwards from its rear edge for a certain distance. The wheeled shelves 6 on each of the track systems are linked one to the next by link means which are not shown, and all roll on their wheels 7a and 7b together as a train, said train being driven along its track system by a train drive means which is not shown. These wheeled shelves 6 are adapted to carry containers 8 which may be adapted for carrying small objects or the like.

To the front of this portion of the article storage warehouse A there is provided an article handling and pushing device B, and to the rear of this portion of the article storage warehouse A there is provided an article pushing out device C. As will shortly be explained, the article handling and pushing device B comprises a vertically movable article handling and pushing assembly E and the article pushing out device C comprises a vertically movable article pushing out assembly F, and this article handling and pushing assembly E and article pushing out assembly F are both moved upwards and downwards by a raising device D; and the preferred embodiment of the article storing and retrieving device of the present invention comprises the combination of the article handling and pushing device B, the article pushing out device C, the raising device D, and means for their interconnection which will be explained hereinafter. The details of the construction of these devices, and their methods of operation, will now be described.

In the article handling and pushing device B, at the front side of the shown portion of the article storage warehouse A, there is provided a support column 9, from the side of which there extends a reinforcing edge 9a which serves as a guide member. In fact, typically several such support columns 9 are provided, but only one can be seen in the FIGURE. The article handling and pushing assembly E comprises a base plate 4 which is horizontal, to the front of which there is fixed a vertically extending support member 15. On the support member 15 there are rotatably mounted a plurality of pairs of rollers 16, the two rollers of each of said pairs of rollers 16 being located on opposite sides of the reinforcing guide edge 9a of the support column 9, and by the rolling of these rollers 16 on said reinforcing guide edge 9a the article handling and pushing assembly E is guided so as to slide up and down along the support column 9 and is restrained to move substantially only in the vertical direction, without being able to rotate abouty any axis or to wander in the horizontal direction, with the base plate 14 opposing the fronts of the stacked track systems of the article storage warehouse A with a small gap being left therebetween.

In the raising device D, also at the front side of the shown portion of the article storage warehouse A, there is provided a support column 10, from the side of which there extends a reinforcing edge 10a which serves also as a guide member. In fact, typically several such support columns 10 are provided, but only one can be seen in the FIGURE. The raising device D comprises an elevator device 22, to the rear of which there is fixed a vertically extending support member 23. On the support member 23 there are rotatably mounted a plurality of pairs of rollers 24, the two rollers of each of said pairs of rollers 24 being located on opposite sides of the reinforcing guide edge 10a of the support column 10, and by the rolling of these rollers 24 on said reinforcing guide edge 10a the elevator device 22 is guided so as to slide up and down along the support column 10 and is restrained to move substantially only in the vertical direction, without being able to rotate about any axis or to wander in the horizontal direction.

In the article pushing out device C, at the rear side of the shown portion of the article storage warehouse A, there is provided a support column 11, from the side of which there extends a reinforcing edge 11a which serves also as a guide member. In fact, typically several such support columns 11 are provided, but only one can be seen in the FIGURE. The article pushing out assembly F comprises an air cylinder 18 which is horizontal, to the rear of which there is fixed a vertically extending support member 19. On the support member 19 there are rotatably mounted a plurality of pairs of rollers 20, the two rollers of each of said pairs of rollers 20 being located on opposite sides of the reinforcing guide edge 11a of the support column 11, and by the rolling of these rollers 20 on said reinforcing guide edge 11a the article pushing out assembly F is guided so as to slide up and down along the support column 11 and is restrained to move substantially only in the vertical direction, without being able to rotate about any axis or to wander in the horizontal direction, with the air cylinder 18 opposing the rears of the stacked track systems of the article storage warehouse A with a small gap being left therebetween.

The upper ends of the support columns 9, 10, and 11, and of the front vertical columns 1 and of the rear vertical columns 2, are secured together by a plurality of upper connecting rods 12; and the lower ends of the support columns 9, 10, and 11, and of the front vertical columns 1 and of the rear vertical columns 2, are secured together by a plurality of lower connecting rods 13.

On the horizontal base plate 14 of this article handling and pushing assembly E, to the front of which as mentioned previously there is fixed the vertically extending support member 15, there is also provided a push arm 17, which, under the control of an overall control system (not shown) for the complete combination of the automatic article storage warehouse A and the article storing and retrieving device of the present invention, either can be moved so as to be completely located below the level of said horizontal base plate 14, or can be moved so that its rear end (the left hand end in the FIGURE) is raised up and is then advanced rearwards so as to push against the front end of a container 8 resting on said horizontal base plate 14 and so as to push it in the rearwards direction off the horizontal base plate 14, in cooperation with endless rotating support chains which are not shown.

The article pushing out assembly F comprises the aforementioned horizontal air cylinder 18 supported by the vertically extending support member 19, and also comprises an air control valve assembly 21, which under the control of said overall control system not shown in the drawing selectively supplies compressed air to either one side or the other of said air cylinder 18, so as either to protrude or to retract its piston member; and when said piston member is thus protruded from said air cylinder 18 it pushes against the rear end of a container 8 resting on the one of said wheeled shelves 6 which is on the same level as the current level of the article pushing out assembly F so that said container 8 is slid off said wheeled shelf 6 to the forwards direction.

The elevator device 22 of the raising device D comprises a motor not shown in the drawing, which is controlled by said overall control system so as to pull in the one or the other direction on a chain 25, the upper end of which is secured to a point on one of the upper connecting rods 12 and the lower end of which is secured to a point on one of the lower connecting rods 13, said chain 25 thus being tightly extended in the vertical direction parallel to the support column 10; so that thereby the elevator device 22 is either respectively raised up or lowered down the support column 10 via the rollers 24. The elevator device 22 is attached to the one ends of first and second cables 29 and 30. The first cable 29 passes from the elevator device 22 upwards, around a first pulley 26, horizontally for a relatively short distance, around another pulley 27, and downwards to its other end which is attached to a point approximately above the center of gravity of the article handling and pushing assembly E and supports it, fixing its position in the vertical direction. The second cable 30 also passes from the elevator device 22 upwards, around another pulley 26 coaxial with the first pulley 26, horizontally for a relatively long distance, around another pulley 28, and downwards to its other end which is attached to a point approximately above the center of gravity of the article pushing out assembly F and supports it, fixing its position in the vertical direction. The weight of the elevator device 22 is arranged to be approximately equal to the sum of the weight of the article handling and pushing assembly E and the weight of the article pushing out assembly F, so as to act as a counterweight for them. Particularly according to a particular important feature of the present invention, the lengths of the first and second cables 29 and 30 are so arranged that the article handling and pushing assembly E and the article pushing out assembly F are always supported at substantially the same height; and, also according to a feature of the present invention, said cable length are so arranged that when the elevator device 22 is at approximately the midpoint in the vertical direction of the support column 10, also the article handling and pushing assembly E and the article pushing out assembly F are at approximately the midpoints in the vertical direction respectively of the support column 9 and the support column 11. This last feature ensures that by raising and lowering the elevator device 22 to various points along the support column 10 the article handling and pushing assembly E and the article pushing out assembly F may be positioned to correspond in the vertical direction to any one of the stacked wheeled shelves 6, from the highest to the lowest thereof.

The shown and described article storage warehouse A and the article storing and retrieving device of the present invention are operated for storing and retrieving articles as follows.

When the article storing and retrieving device of the present invention is not being operated, the elevator device 22 is positioned at a certain so called rest position along its support column 10, in which the article handling and pushing assembly E is positioned at a so called rest position which is at a height along its support column 9 at which it is convenient to work. Now, when a container 8 is available which it is desired to store in the article storage warehouse A, then an operator of the system places said container 8 on the horizontal base plate 14 of the article handling and pushing assembly E in said convenient working fashion, and said aforesaid overall control system determines an appropriate one of said wheeled shelves 6 (which of course is currently empty) for storage of said container 8. This may be done by a computerized index system or the like; the details are not directly relevant to the present invention. Then, under the control of the overall control system, the article handling and pushing assembly E is raised up to an appropriate height along its support column 9, by operating the motor of the elevator device 22 to lower it along its support column 10 as has already been explained, and simultaneously the appropriate train of wheeled shelves 6 is moved along its rails 4 and 5 (if necessary) under the control of the overall control system. In fact, at the same time as the article handling and pushing assembly E is thus raised, also simultaneously the pushing out assembly F will be raised along its support column 11, but this is irrelevant to the operation in this case. When the article handling and pushing assembly E has been raised to oppose said appropriate train of wheeled shelves 6, and when also said appropriate wheeled shelf 6 of said train has been brought to oppose the article handling and pushing assembly E and the container 8 on the horizontal base plate 14 thereof, then the article handling and pushing assembly E is operated to push the container 8 off from its horizontal base plate 14 and onto said appropriate wheeled shelf 6. Finally, the overall control system returns the elevator device 22 and the article handling and pushing assembly E (and also the article pushing out assembly F) to their original or rest positions.

On the other hand, when it is desired to retrieve one of the containers 8 which is currently stored on one of the wheeled shelves 6 of the article storage warehouse A, then following a command by the operator said overall control systems determines which particular one of said wheeled shelves 6 is currently holding said container 8, again using a computerized index system or the like. Then, under the control of the overall control system, the article handling and pushing assembly E is raised up to an appropriate height along its support column 9, by operating the motor of the elevator device 22 to lower it along its support column 10 as has already been explained, and simultaneously the appropriate train of wheeled shelves 6 is moved along its rails 4 and 5 (if necessary) under the control of the overall control system, and automatically at the same time as the article handling and pushing assembly E is thus raised, also simultaneously the pushing out assembly F will be raised along its support column 11, so as always to be at approximately the same height as the article handling and pushing assembly E. When the article handling and pushing assembly E and the article pushing out assembly F have been raised so that they both oppose said appropriate train of wheeled shelves 6, and when also said appropriate wheeled shelf 6 of said train and said container 8 supported thereon have been brought to oppose the horizontal base plate 14 of the article handling and pushing assembly E and the article pushing out assembly F, then the article pushing out assembly F is operated to push the container 8 off from said wheeled shelf 6 and onto said horizontal base plate 14 of said article handling and pushing assembly E. This pushing off operation is accomplished simply be protruding the piston member of the air cylinder 18, of course. The push arm 17 is also of course not operated at this time. Finally, the overall control system returns the elevator device 22 and the article handling and pushing assembly E (and also the article pushing out assembly F) to their original or rest positions, with now the desired container 8 resting on the horizontal base plate 14 of the article handling and pushing assembly E, at the appropriate convenient working height ready for removal by the operator.

Since the article pushing out assembly F is moved up and down the stack of shelves 6, only one such article pushing out assembly F is required. Further, since the article handling and pushing assembly E and the article pushing out assembly F are moved together and are kept always at substantially the same height by the simple and reliable construction shown, no complicated individually controllable raising and lowering means is required for the article pushing out assembly F.

According to the shown construction, it is possible to store containers such as the containers 8 freely and easily on any one of the wheeled shelves 6, and to retrieve said containers, without any requirement being made at any time for working at an inconvenient height; at all times the placing and removal of the containers is performed at the most convenient working height. Thereby the height of the storage warehouse A can be made as great as practicable within the limitations of space and so on, without any problems of working height difficulties arising.

The construction of the shown device should not be considered limiting; for instance, the positioning of the elevator device 22 and of its support column 10 could be different. Further, the article storing and retrieving device of the present invention is not to be considered as limited in its application to the shown case of stacks of movable shelf trains, since if the article storing and retrieving device of the present invention were mounted on a sideways movable base it could equally well be applied to a stack of fixed shelves. Therefore, although the present invention has been shown and described with reference to a preferred embodiment thereof, and in terms of the illustrative drawing, various possible modifications, omissions, and alterations could be conceived of by one skilled in the art to the form and the content of any particular embodiment, without departing from the scope of the present invention.

What is claimed is:

1. An article storing and retrieving device, for use with a stacked set of a plurality of shelves, comprising:
    (a) an article handling and pushing device, located on one side of said set of stacked shelves, movable in the vertical direction, and comprising a transfer shelf which can be brought to oppose any selected one of said stacked set of shelves by said vertical motion, and a means for moving articles from said transfer shelf away from said article handling and pushing device onto said opposed one of said stacked shelves;
    (b) an article pushing out device located on the other side of said set of stacked shelves, movable in the vertical direction, which can be brought to oppose any selected one of said stacked set of shelves by said vertical motion, and comprising a means for pushing articles off from said selected one of said stacked shelves away from itself; and
    (c) a raising device, which moves both said article handling and pushing device and said article pushing out device in the vertical direction, and which keeps both said article handling and pushing device and said article pushing out device at substantially the same height at all times.

2. An article storing and retrieving device according to claim 1, wherein said raising device comprises an elevator device which is movable in a certain direction, a first and a second cable, and first and second pulley systems over which said first and said second cable respectively pass; the one ends of said first and second cables being attached to said elevator device so as to be pulled by said elevator device during its said motion, and the other ends of said first and second cables being respectively attached to said article handling and pushing device and said article pushing out device so as to support them in the vertical direction.

* * * * *